US007010179B2

(12) United States Patent
Hatta et al.

(10) Patent No.: US 7,010,179 B2
(45) Date of Patent: Mar. 7, 2006

(54) DIFFERENTIAL DRIVE SEMICONDUCTOR OPTICAL MODULATOR

(75) Inventors: Tatsuo Hatta, Tokyo (JP); Norio Okada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 159 days.

(21) Appl. No.: 10/805,289

(22) Filed: Mar. 22, 2004

(65) Prior Publication Data

US 2004/0202397 A1 Oct. 14, 2004

(30) Foreign Application Priority Data

Apr. 11, 2003 (JP) .............................. 2003-107680

(51) Int. Cl.
G02F 1/01 (2006.01)
G02F 1/035 (2006.01)
G02F 1/03 (2006.01)
G02B 6/12 (2006.01)

(52) U.S. Cl. ................. 385/1; 385/3; 385/14; 359/245; 359/248; 359/254

(58) Field of Classification Search ................ 359/245, 359/248, 254; 385/1–3, 14, 130, 131
See application file for complete search history.

(56) References Cited

U.S. PATENT DOCUMENTS 5,930,022 A 7/1999 Okuma
6,192,167 B1 * 2/2001 Kissa et al. .................... 385/3

FOREIGN PATENT DOCUMENTS

JP 2002-277840 9/2002
JP 2002-296552 10/2002

OTHER PUBLICATIONS

"OFC 2002 Optical Fiber Communication Conference and Exhibit; Changing at light speed", *IEEE*, Mar. 17-22, 2002, pp. 336-337, Anaheim CA.

* cited by examiner

Primary Examiner—Georgia Epps
Assistant Examiner—Jack Dinh
(74) Attorney, Agent, or Firm—Leydig, Voit & Mayer, Ltd.

(57) ABSTRACT

A differential drive semiconductor optical modulator includes: a differential driver circuit having output pads which can output a pair of differential signals; a transmission-line substrate having transmission lines connected to the output pads and ground lines; and semiconductor modulators mounted on the transmission-line substrate, arranged in series along a common optical axis; terminal resistors connected to terminal ends of the transmission lines and inductances interposed between the semiconductor modulators and the terminal resistors, on the transmission-line substrate, producing an appropriate optical modulation waveform with a high extinction ratio and enhanced modulation bandwidth.

10 Claims, 6 Drawing Sheets

DIFFERENTIAL DRIVE SEMICONDUCTOR OPTICAL MODULATOR

BACKGROUND OF THE INVENTION

1. Field of the Invention

The present invention relates to a differential drive semiconductor optical modulator, which is suitable for an optical modulator in optical transmission systems.

2. Description of the Related Art

In optical transmission systems, a optical modulator for modulating light based on an electric signal is used, and the signal transmission capacity can be improved by enhancing the modulation rate thereof.

The related prior arts are listed as follows:

[document 1] U.S. Pat. No. 5,930,022

[document 2] Japanese Patent Unexamined Publications (koukai): JP-2002-277840, A

[document 3] Japanese Patent Unexamined Publications (koukai): JP-2002-296552, A

[document 4] Hiroaki Takeuchi et al., "High-speed Electroabsorption Modulators with Traveling-Wave Electrodes", OFC2002 Technical Digest WV1, 2002

The document 1 discloses an example where a differential amplifier is employed for a driver circuit of an electroabsorption (EA) type optical modulator, in which one drain of a differential FET is connected to a load resistor and another drain of another differential FET is connected to a parallel circuit including an EA modulator and a variable impedance circuit. However, since only one of two differential outputs is utilized for a driving signal and another of differential outputs is not utilized, resulting in a drawback in respect of power consumption and voltage use efficiency.

The document 2 discloses an optical module having a transmission-line substrate, semiconductor optical modulators and a terminator substrate mounted separately thereon, wherein these components are mutually wired.

The document 3 discloses an electro-absorption type optical modulator in which two electro-absorption type optical modulator are arranged in series along an optic axis and one optical modulator is supplied with an NRZ (non-return to zero) data signal and another optical modulator is supplied with a clock signal, thereby performing optically RZ (return to zero) coding.

The document 4 discloses that in case of a semiconductor optical modulator lengthened, degradation of the modulation band can be prevented by designing the characteristic impedance of the optical modulator at 50 ohms. However, it is difficult to manufacture such a modulator and attain a sufficient performance since the manufacturing process is super-fine.

SUMMARY OF THE INVENTION

The purpose of the present invention is to provide a differential drive type semiconductor optical modulator which can obtain an appropriate optical modulation waveform with a high extinction ratio and remarkably enhance a frequency bandwidth of modulation.

A differential drive type semiconductor optical modulator according to the present invention includes:

a differential driver circuit having a first and a second output terminals which can output a pair of differential signals;

a transmission-line substrate having a first transmission line connected to the first output terminal, a second transmission line connected to the second output terminal and a ground line;

a first semiconductor modulator connected between the first transmission line and the ground line, mounted on the transmission-line substrate; and a second semiconductor modulator connected between the second transmission line and the ground line, mounted on the transmission-line substrate; the first and second semiconductor modulators being arranged in series along a common optic axis wherein a first terminal resistor connected between a terminal end of the first transmission line and the ground line, a second terminal resistor connected between a terminal end of the second transmission line and the ground line, a first inductance interposed between the first semiconductor modulator and the first terminal resistor, and a second inductance interposed between the second semiconductor modulator and the second terminal resistor are provided on the transmission-line substrate.

In the present invention, the first semiconductor modulator may be arranged in the optical incident side of the optic axis rather than the second semiconductor modulator, and the optical path length of the first semiconductor modulator may be shorter than the optical path length of the second semiconductor modulator.

In addition, the differential drive type semiconductor optical modulator may further includes an optical modulator integrated device in which the first and second semiconductor modulators and an optical waveguide for optically connecting the first and second semiconductor modulators are integrated.

Each of driving electrodes of the first and second semiconductor modulators may be arranged on the principal plane of the optical modulator integrated device.

The optical modulator integrated device may be mounted on the transmission-line substrate by flip-chip mounting.

The first and second inductances may be formed of slimmed portions in the transmission lines.

The first and second semiconductor modulators may be mounted onto the close proximity of the first and second inductances.

Furthermore, an electric delay portion due to the difference in path-length may be provided in at least one of the first and second transmission lines.

A phase inverter for inverting phase of signal may be provided in at least one of the first and second transmission lines.

The differential signal from the differential driver circuit may be an RZ signal.

According to the present invention, in a differential driving system of semiconductor modulators, differential signals are transferred along transmission lines and additive inductance is provided in the output side of each semiconductor modulator, thereby compensating narrowing of bandwidth due to junction capacitance of each semiconductor modulator. Consequently, an appropriate optical modulation waveform with a higher extinction ratio can be attained, resulting in remarkable enhancement of modulation bandwidth.

DETAILED DESCRIPTION OF THE PREFERRED EMBODIMENTS

This application is based on an application No. 2003-107680 filed Apr. 11, 2003 in Japan, the disclosure of which is incorporated herein by reference.

Hereinafter, preferred embodiments will be described with reference to drawings.

Embodiment 1

Figure 1:
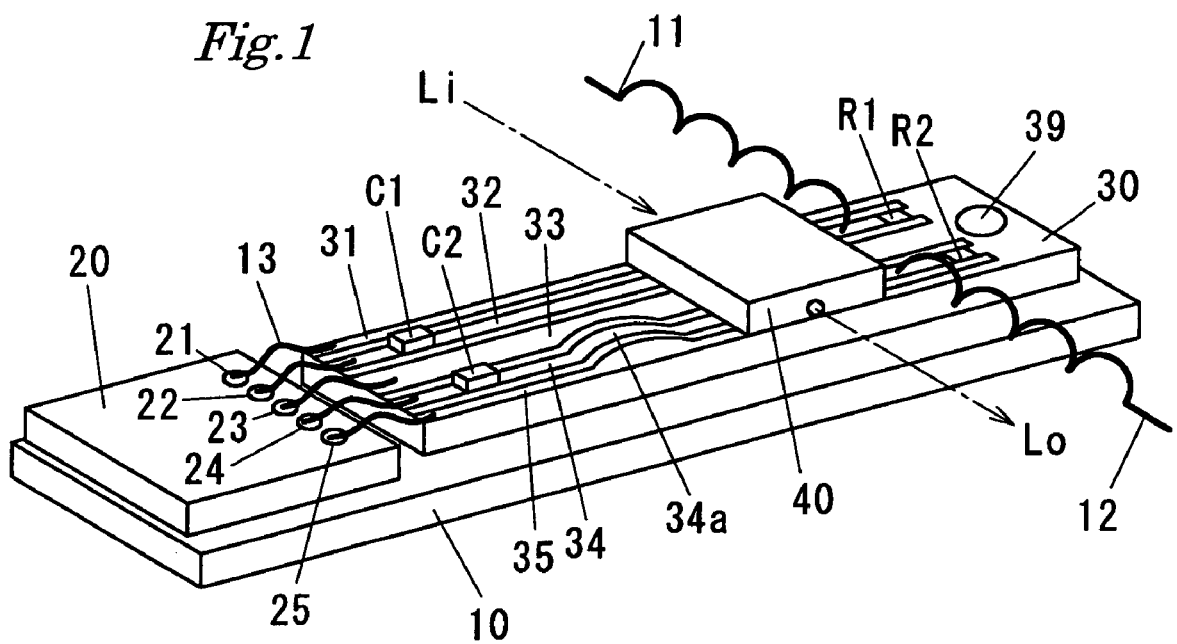
FIG. 1 is a perspective view showing a first embodiment of the present invention.

FIG. 1 is a perspective view showing a first embodiment of the-present invention. A differential drive type semiconductor optical modulator includes a chip carrier 10, a differential driver circuit 20 mounted on the chip carrier 10, a transmission-line substrate 30 mounted on the chip carrier 10, and a optical modulator integrated device 40 mounted on the transmission-line substrate 30.

The chip carrier 10 is formed in a rectangle shape of a conductive material, such as metals, or an electrically insulating material, such as ceramics, to serve as a base of the whole optical modulator.

The differential driver circuit 20 serves to output a pair of differential signals Sa and Sb for driving the optical modulator integrated device 40 based on a modulation signal from an external circuit. The circuit 20 is constituted of an integrated circuit in which a number of transistors are integrated on an substrate of, e.g. InP, which is mounted on the chip carrier 10 by die bonding. On the upper face of the differential driver circuit 20, provided are an output pad 22 for supplying one differential signal Sa, an output pad 24 for supplying another differential signal Sb and pads 21, 23 and 25 for grounding, respectively.

Figure 3:
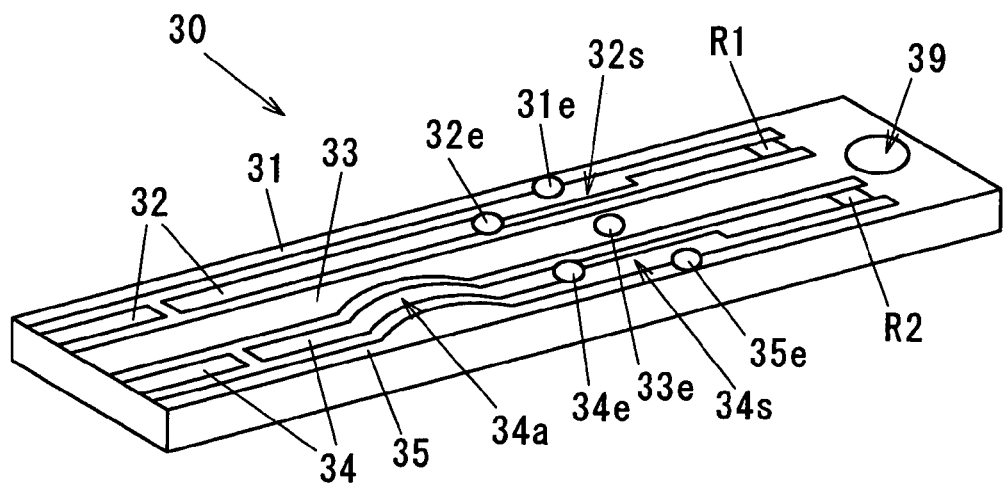
FIG. 3 is a perspective view showing the transmission-line substrate in FIG. 1.

The transmission-line substrate 30 is, as also shown in FIG. 3, formed in a rectangle shape of an electrically insulating material, such as ceramics, and on the upper face thereof five transmission lines 31 to 35 which constitute grounded coplanar type distributed constant lines are provided along the longitudinal direction of the substrate. The transmission lines 31 to 35 are separately connected with the pads 21 to 25 through five wires 13 by wedge bonding. The transmission line 32 can transfer the differential signal Sa from the output pad 22 and the transmission line 34 can transfer the differential signal Sb from the output pad 24. The transmission lines 31, 33 and 35 are ground lines, which are connected in common in the terminal side of the substrate 30. An additive ground line may be formed on the side face of the substrate 30 if needed.

In the transmission lines 32 and 34, chip type capacitors C1 and C2 for cutting off DC components are interposed near the joints of the wires.

Moreover, in the transmission line 34, a curved portion is formed between the capacitor C2 and the optical modulator integrated device 40 to constitute an electric delay line 34a. While the transmission line 32 is linear, the transmission line 34 is lengthened as a whole due to the curved portion so that signal delay in the transmission line 34 can be added in comparison with the transmission line 32.

Wires 11 and 12 for supplying the optical modulator integrated device 40 with bias voltages are connected to the transmission lines 32 and 34 between the optical modulator integrated device 40 and the terminal ends.

Terminal resistors R1 and R2 for impedance-matching are formed between the terminal ends of the transmission lines 32 and 34 and the common connection portions of the ground lines using thin film deposition process. In case characteristic impedance of the distributed constant line is 50 ohms, the terminal resistors R1 and R2 are set at 50 ohms.

In the terminal end of the substrate 30, a through hole 39 is formed to secure an electric connection between the upper and lower faces of the substrate 30.

Figure 2:
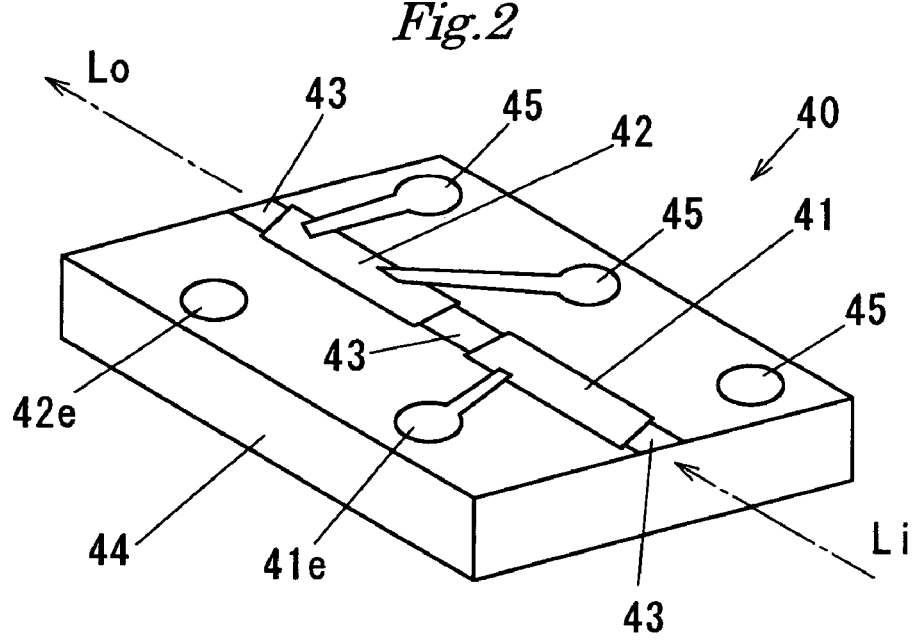
FIG. 2 is a perspective view showing the back face of the optical modulator integrated device in FIG. 1.

FIG. 2 is a perspective view showing the back face of the optical modulator integrated device 40 in FIG. 1. The optical modulator integrated device 40 is a chip in the shape of a rectangular parallelepiped which has been cut away from a semiconductor wafer, which includes semiconductor modulators 41 and 42 arranged in series along a common optic axis, and an optical waveguide 43 for optically connecting the semiconductor modulators 41 and 42.

In the optical modulator integrated device 40, the semiconductor modulators 41 and 42 and the optical waveguide 43 are integrated to form a single chip of a monolithic integrated circuit, thereby reducing the optical connection loss of the semiconductor modulators 41 and 42 and enabling higher frequency electrical operation. In addition, by downsizing the optical modulator integrated device 40, phase shift between driving signals of the semiconductor modulators 41 and 42 becomes smaller to facilitate phase-matching of a modulation pulse.

Each of the semiconductor modulators 41 and 42 can be constituted of an electro-absorption (EA) type optical modulator using, for example, quantum confined Stark effect or Franz-Keldysh effect, the equivalent circuit thereof can be expressed as a p-n junction diode.

The optical waveguide 43 can guide the incident light Li entering the optical modulator integrated device 40 to the semiconductor modulator 41, and then the light passing through the semiconductor modulator 41 to the semiconductor modulator 42 to output the exit light Lo from the optical modulator integrated device 40.

On the back face of the optical modulator integrated device 40, a cathode 41e of the semiconductor modulator 41 and an anode 42e of the semiconductor modulator 42 are provided separately, and common electrodes 45 to which an anode of the semiconductor modulator 41 and a cathode of the semiconductor modulator 42 are connected in common are provided at three locations.

Such arrangement of all the electrodes for connection to the substrate on the one-sided principal plane enables the optical modulator integrated device 40 to be mounted by flip-chip mounting. In addition, the line pattern on the substrate may be changed ad libitum to arbitrarily change driving polarities of the semiconductor modulator 41 and 42, thereby enhancing the freedom of circuit design.

FIG. 3 is a perspective view showing the transmission-line substrate 30 in FIG. 1. The transmission-line substrate 30 can be formed by forming an Au thin film on the whole substrate of, e.g. ceramics with a dielectric constant of about 10 using vapor deposition, and then patterning strip lines using etching. The Au thin film may be also formed on the side face of the substrate to reinforce grounding.

As described above, five transmission lines 31 to 35 are provided on the transmission-line substrate 30 along the longitudinal direction of the substrate. The transmission lines 32 and 34 are divided at locations on which the capacitors C1 and C2 are mounted.

Five connecting pads 31e to 35e are formed in correspondence to each location of the electrodes on the back face of the optical modulator integrated device 40. The pad 32e is provided on the transmission lines 32 for connecting to the cathode 41e of the optical modulator integrated device 40. The pad 34e is provided on the transmission lines 34 for connecting to the anode 42e of the optical modulator integrated device 40. The pads 31e, 33e and 35e are provided on the transmission lines 31, 33 and 35 for connecting to the three common electrodes 45, respectively.

Electric-connection between the electrodes and the pads is completed by bonding in advance solder bumps, such as Au, onto the electrodes 41e, 42e and 45 of the optical modulator integrated device 40 and the pads 31e to 35e of the transmission-line substrate 30, and then mounting the optical modulator integrated device 40 as shown in FIG. 2 reversely on the transmission-line substrate 30, and then heating the substrate 30 up to a melting point of solder.

In the transmission lines 32 and 34, slimmed portions with predetermined lengths are formed between the pads 32e and 34e and the terminal resistors R1 and R2, respectively, thereby forming inductance portions 32s and 34s.

Figure 4:
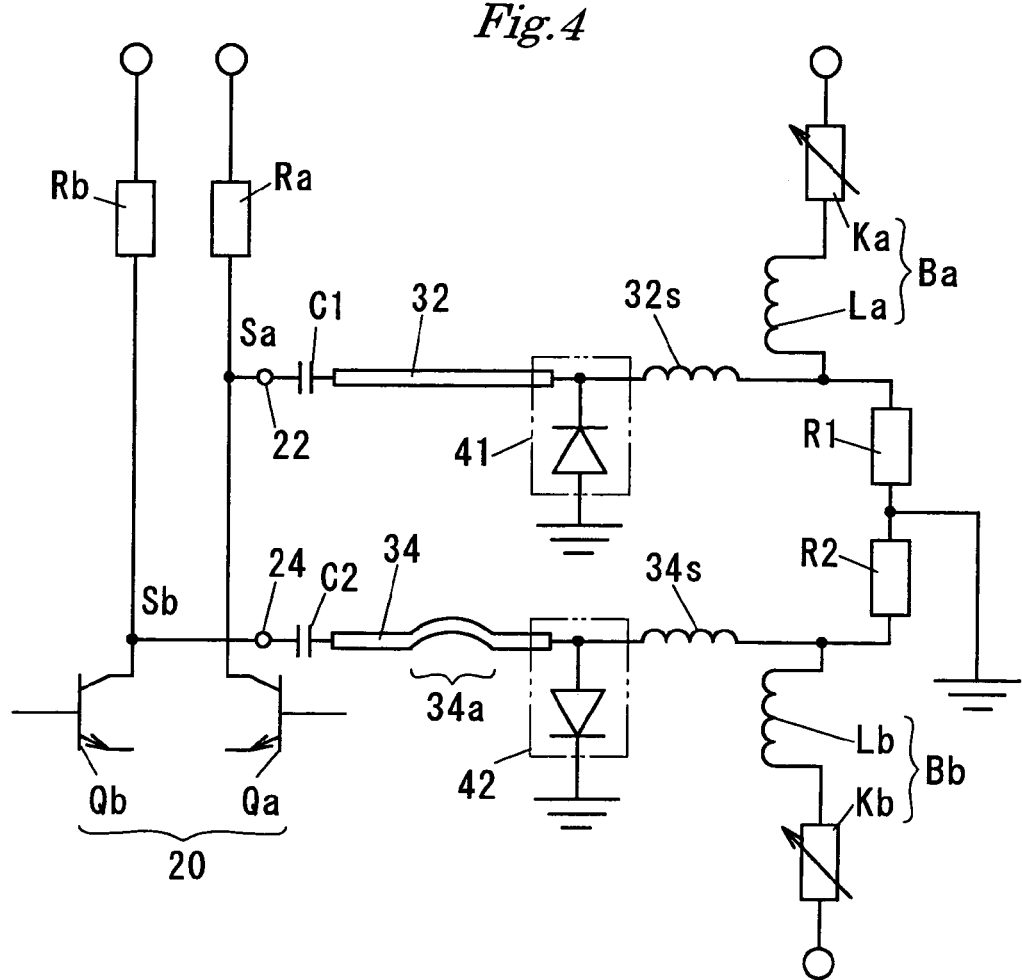
FIG. 4 is a circuit diagram showing an electric configuration according to the first embodiment of the present invention.

FIG. 4 is a circuit diagram showing an electric configuration according to the first embodiment of the present invention. A differential driver circuit 20 includes differential transistors Qa and Qb whose emitters are connected in common to a constant current source or the like, and load resistors Ra and Rb connected to collectors of the differential transistors Qa and Qb.

The cathode of the semiconductor modulator 41 is connected to the transmission line 32, and the anode of the semiconductor modulator 41 is connected to the ground line. A bias circuit Ba is connected through the wire 11 in FIG. 1 to a portion between the inductance portion 32s and the terminal resistor R1 of the transmission line 32.

The anode of the semiconductor modulator 42 is connected to the transmission line 34, and the cathode of the semiconductor modulator 42 is connected to the ground line. A bias circuit Bb is connected through the wire 12 in FIG. 1 to a portion between the inductance portion 34s and the terminal resistor R2 of the transmission line 34.

The bias circuit Ba includes a series circuit of both a variable resistor Ka and inductance La having a sufficiently high impedance within a signal frequency band, whose one terminal is connected to a power supply line. A desired DC-bias voltage is supplied to the semiconductor modulator 41 accordingly to a resistance value of the variable resistor Ka so as to optimize an operating point of the semiconductor modulator 41.

The bias circuit Bb includes a series circuit of both a variable resistor Kb and inductance Lb having a sufficiently high impedance within a signal frequency band, whose one terminal is connected to a power supply line. A desired DC-bias voltage is supplied to the semiconductor modulator 42 accordingly to a resistance value of the variable resistor Kb so as to optimize an operating point of the semiconductor modulator 42.

The operation will be described hereinafter. When modulation signals which are mutually inversed are inputted into each of the bases of differential transistors Qa and Qb, differential signals Sa and Sb are outputted from each of the collectors of differential transistors Qa and Qb to supply the signals through the output pads 22 and 24 to the transmission lines 32 and 34, respectively.

After DC components of the differential signals Sa and Sb are removed by the capacitors C1 and C2, the signals Sa and Sb are transferred along the transmission lines 32 and 34 to drive the semiconductor modulators 41 and 42 by voltage. The differential signal Sb is phase-shifted by a predetermined phase due to the electric delay line 34a in the middle of the transmission line 34.

The semiconductor modulators 41 and 42 can cause light absorption according to the electro-absorption effect when the reverse voltage is applied to the p-n junction. Since the voltage waveforms of the differential signals Sa and Sb are mutually in reversed phase, connecting the semiconductor modulators 41 and 42 in mutually inversed polarities enables the light to modulate the light in-phase. The operating points of the semiconductor modulators 41 and 42 can be separately set up by adjusting the DC-bias voltage from the bias circuits Ba and Bb.

The semiconductor modulators 41 and 42 are so arranged that, as shown in FIG. 1, the incident light Li can primarily pass through the semiconductor modulator 41 and secondly pass through the semiconductor modulator 42. Therefore, the incident light Li is subject to both of the amplitude modulation of the semiconductor modulator 41 and the amplitude modulation of the semiconductor modulator 42, resulting in the exit light Lo having an optical modulation waveform with a higher extinction ratio.

It take a certain time that light propagates from the semiconductor modulator 41 to the semiconductor modulator 42. Therefore, providing the electric delay line 34a corresponding to the delay of the light propagation enables timings of modulation of the semiconductor modulators 41 and 42 to coincide with each other, resulting in an appropriate optical modulation waveform with a higher extinction ratio.

In case of supplying modulation signals of 40 Gbit/sec for the differential signals Sa and Sb, for example, the incident light Li is converted into an optical modulation signal of 40 Gbit/sec by double-modulation of the semiconductor modulators 41 and 42 to be outputted for the exit light Lo, which may be sent out into, e.g. an optical transmission path to attain high-speed and long-distance optical communications.

Figure 5:
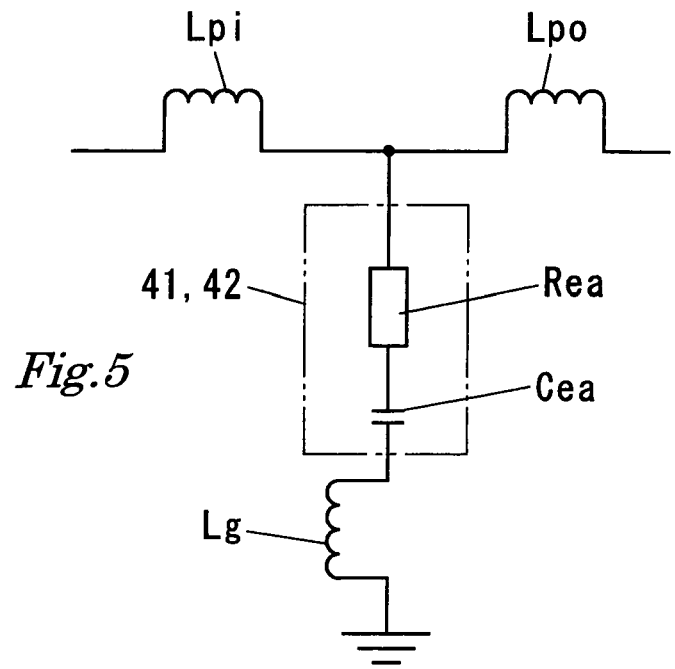
FIG. 5 is an equivalent circuit diagram of the semiconductor modulators in mounted conditions.

FIG. 5 is an equivalent circuit diagram of the semiconductor modulators 41 and 42 in mounted conditions. Each of the semiconductor modulators 41 and 42 can be expressed by a series circuit of both the internal resistance Rea of the semiconductor and the electric capacitance Cea of the p-n junction. Furthermore, the wiring inductance Lpi exists in the input side of each semiconductor modulator, the wiring inductance Lpo exists in the output side thereof, and the wiring inductance Lg exists in the ground side thereof, respectively.

The transmission lines 32 and 34 are constituted of distributed constant lines in mounted conditions as shown in FIG. 1, and the transmission lines 31, 33 and 35 are also sufficiently reinforced. The optical modulator integrated device 40 is mounted by flip-chip mounting. Therefore, both the wiring inductance Lpi in the input side and the wiring inductance Lg in the ground side are negligibly small. The junction capacitance Cea is determined by the structure and form of the semiconductor modulators 41 and 42, generally Cea=0.1 pF.

The wiring inductance Lpo in the output side is dominated by the inductance portions 32s and 34s due to the slimmed portions of the transmission lines 32 and 34, generally Lpo=850 pH in case of considering compensation of the junction capacitance Cea.

Figure 7:
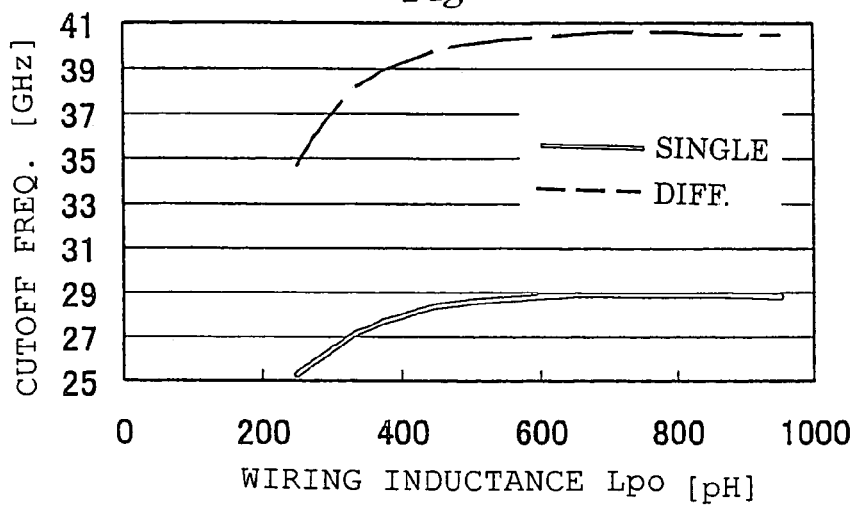
FIG. 7 is a graph showing an example of relations between a cutoff frequency and the wiring inductance Lpo in the output side.

FIG. 7 is a graph showing an example of relations between a cutoff frequency and the wiring inductance Lpo in the output side. The vertical axis shows the cutoff frequency [GHz] of the semiconductor modulator. The horizontal axis shows the wiring inductance Lpo [pH] in the output side thereof. The broken line shows a case of the differential driving system where two semiconductor modulators are differentially driven. The solid line shows a comparative example where a single semiconductor modulator is driven in single phase (refer to FIG. 10).

It can be seen from the graph that the solid line exists within a range of 25 to 29 GHz in cutoff frequency, while the broken line shows a higher cutoff frequency of 35 to 41 GHz and the differential driving system is remarkably excellent.

In addition, the cutoff frequency becomes higher as the wiring inductance Lpo increases from 250 pH, and the cutoff frequency becomes highest near 850 pH in the differential driving system of the broken line. This means that the wiring inductance Lpo in the output side is increased by the slimmed patterns of the transmission lines 32 and 34 to compensate narrowing of bandwidth due to the junction capacitance Cea.

Generally, performance of an optical modulator can be evaluated using parameters of cutoff frequency and extinction ratio, which have trade-off relation in conflict with each other. That is, in order to enhance the extinction ratio of an optical modulator, it is necessary to lengthen the optical path length in the semiconductor modulator, however, as the optical path length becomes longer, the junction capacitance Cea will increase and the cutoff frequency will be lowered.

Figure 8:
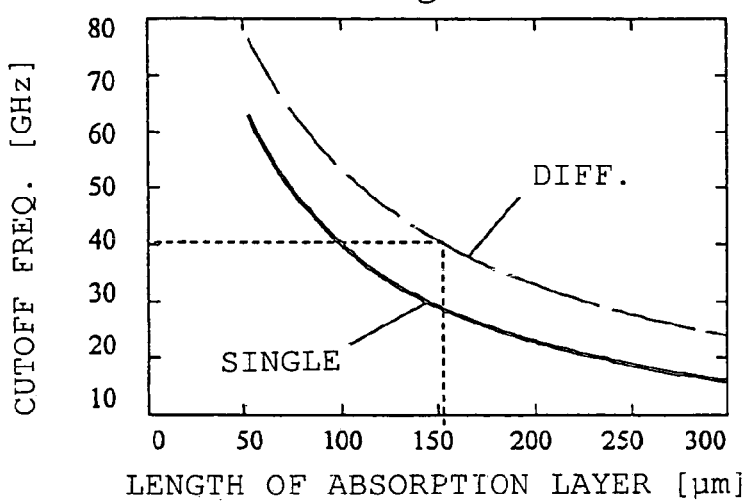
FIG. 8 is a graph showing an example of relations between the cutoff frequency and the length of an absorption layer in the semiconductor modulator.

FIG. 8 is a graph showing an example of relations between the cutoff frequency and the length of an absorption layer in the semiconductor modulator. The vertical axis shows the cutoff frequency [GHz] of the semiconductor modulator. The horizontal axis shows the optical path length [μm] of the absorption layer in the semiconductor modulator. The broken line shows a case of the differential driving system. The solid line shows a comparative example of the single-phase driving system (refer to FIG. 10). Incidentally, the wiring inductance Lpo is set at 850 pH.

It can be seen from the graph that the longer the optical path length of the absorption layer becomes, the more the cutoff frequency is lowered. In addition, compared to the single-phase driving system of the solid line, the differential driving system of the broken line can be improved by approximately 10 GHz. In case the optical path length of the absorption layer is about 150 μm, for example, the high cutoff frequency of 40 GHz can be attained.

Figure 9:
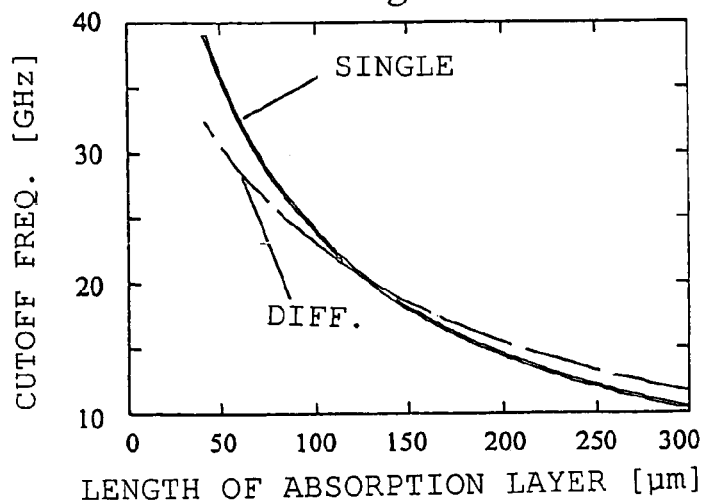
FIG. 9 is a graph showing an example of relations between the cutoff frequency and the length of an-absorption layer in the semiconductor modulator when the wiring inductance Lpo=0 pH.

FIG. 9 is a graph showing an example of relations between the cutoff frequency and the length of an absorption layer in the semiconductor modulator when the wiring inductance Lpo=0 pH. The vertical axis shows the cutoff frequency [GHz] of the semiconductor modulator. The horizontal axis shows the optical path length [μ] of the absorption layer in the semiconductor modulator. The broken line shows a case of the differential driving system. The solid line shows a comparative example of the single-phase driving system (refer to FIG. 10).

It can be seen from the graph that the differential driving system of the broken line is not so different from the single-phase driving system of the solid line. In addition, compared to the graph in FIG. 8, effects of the wiring inductance Lpo can be remarkably brought out under the differential driving system.

Figure 10:
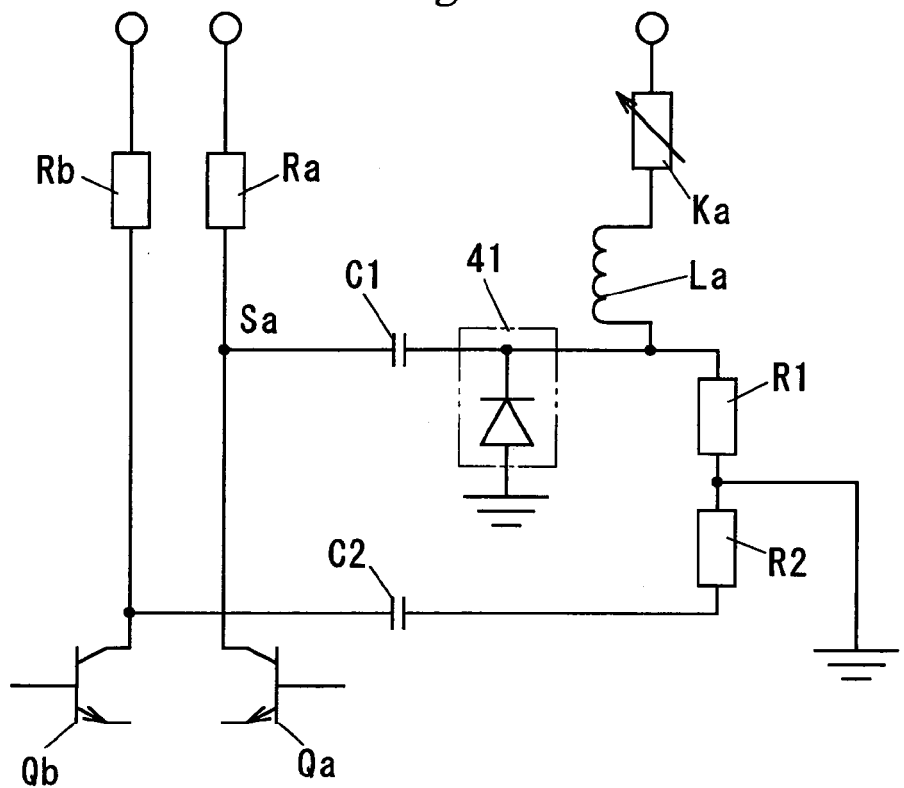
FIG. 10 is a circuit diagram showing a comparative example 1 using single-phase driving system.

FIG. 10 is a circuit diagram showing a comparative example 1 using the single-phase driving system. Only the semiconductor modulator 41 is used for an optical modulator, to which the differential signal Sa from the differential transistor Qa is supplied. The differential signal Sb from the differential transistor Qb is not involved with the optical modulation.

Figure 11:
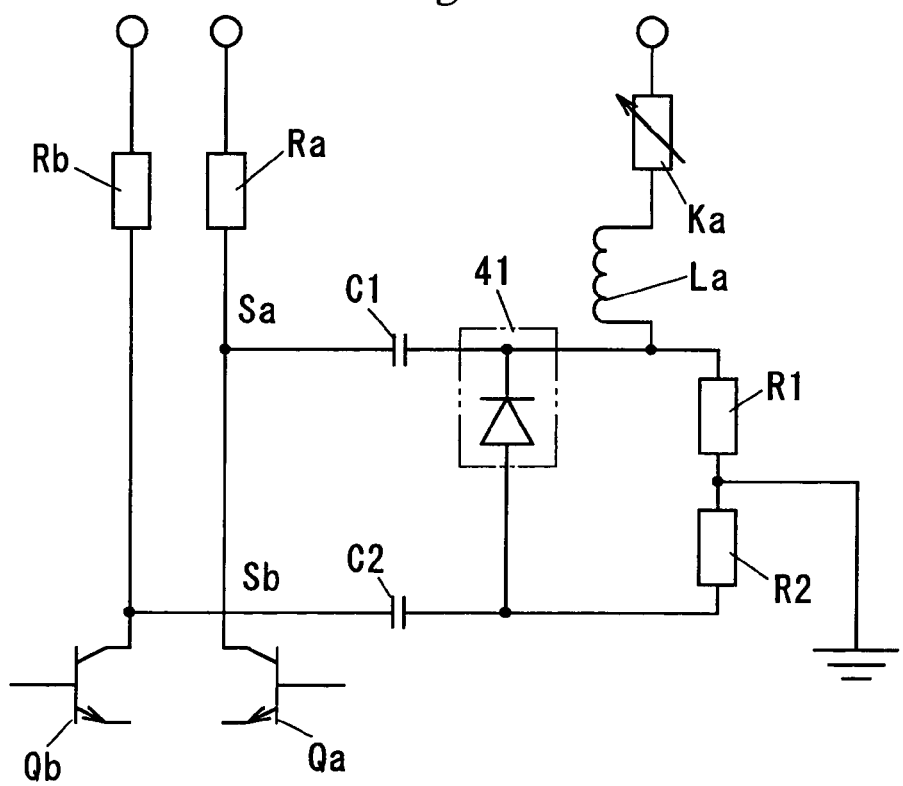
FIG. 11 is a circuit diagram showing a comparative example 2 using single-phase driving system.

FIG. 11 is a circuit diagram showing a comparative example 2 using the single-phase driving system. Only the semiconductor modulator 41 is used for an optical modulator, and the differential signal Sa from the differential transistor Qa is supplied to the cathode of the semiconductor modulator 41 and the differential signal Sb from the differential transistor Qb is supplied to the anode of the semiconductor modulator 41. Therefore, an applied voltage of the semiconductor modulator 41 can be doubled, as compared to in FIG. 10. However, the terminal resistors R1 and R2 are arranged in series with respect to the semiconductor modulator 41, for example, the effective terminal resistance becomes 100 ohms in case R1=R2=50 ohms, resulting in remarkable degradation of modulation bandwidth due to impedance-mismatching.

Thus, in the equivalent circuit of the semiconductor modulator as shown in FIG. 5, the wiring inductance Lpi in the input side is preferably as small as possible. Furthermore, in the differential driving system which can attain a higher extinction ratio, the wiring inductance Lpo in the output side is preferably set measurably more than the inductance of transmission lines in view of the relation with the junction capacitance Cea.

Accordingly, the employment of flip-chip mounting of the optical modulator integrated device 40 enables each electrode of the optical modulator integrated device 40 to directly contact with each pad of the transmission-line substrate 30, thereby reducing both the wiring inductance Lpi in the input side and the wiring inductance Lg in the ground side as much as possible to contribute to enhancement of the cutoff frequency.

In addition, the wiring inductance Lpo in the output side can compensate the junction capacitance Cea by forming the inductance portions 32s and 34s due to the slammed portions of the transmission lines 32 and 34, thereby contributing to enhancement of the cutoff frequency in the differential driving system.

Moreover, the semiconductor modulator 41 is mounted onto the close proximity of the inductance portion 32s with the slimmed pattern and the semiconductor modulator 42 is mounted onto the close proximity of the inductance portion 34s with the slimmed pattern, thereby suppressing emergence of parasitic capacitances between the semiconductor modulators 41 and 42 and the transmission lines 32 and 34 to make less influence on the distributed constant lines.

Figure 12:
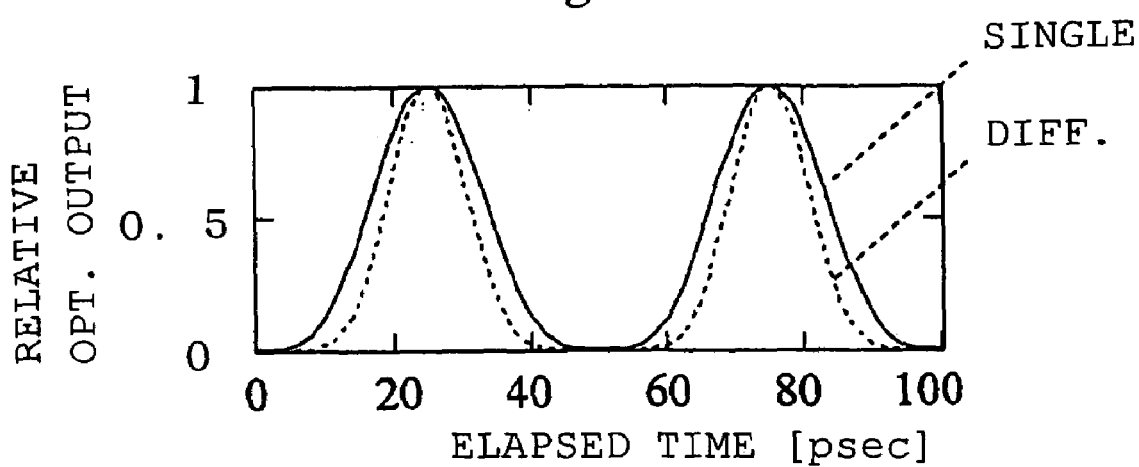
FIG. 12 is a graph showing optical output waveforms of RZ (return to zero) signals of 20 Gbit/sec.

FIG. 12 is a graph showing optical output waveforms of RZ (return to zero) signals of 20 Gbit/sec. The horizontal axis shows elapsed time [psec] and the vertical axis shows relative optical output. The broken line shows a case of the differential driving system and the solid line shows a comparative example of the single-phase driving system (refer to FIG. 10).

It can be seen from the graph that the differential driving system of the broken line shows a steeper optical waveform than that of the single-phase driving system of the solid line. The extinction ratios are comparable with each other.

When performing time-division multiplex by shifting the phase of each RZ signal by 180 degrees, RZ signal of 40 Gbit/sec can be obtained.

Figure 13:
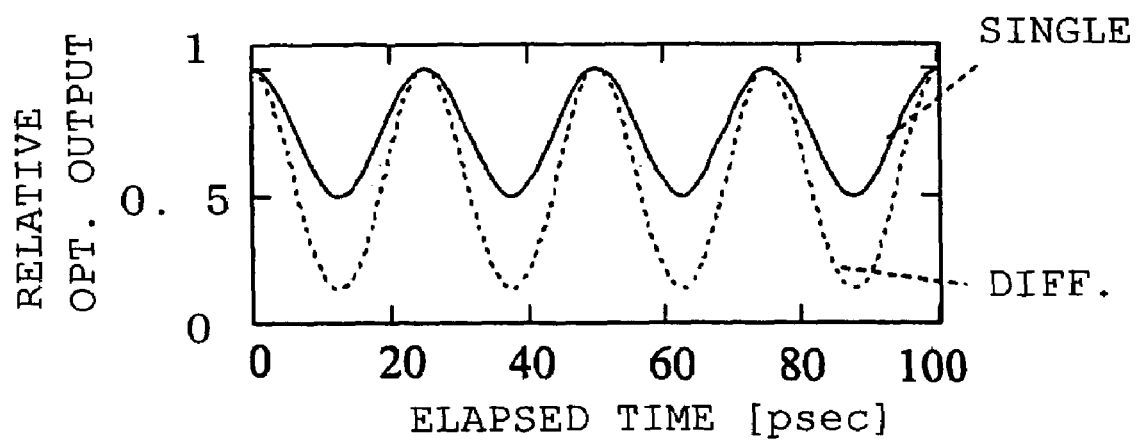
FIG. 13 is a graph showing optical output waveforms of RZ signals of 40 Gbit/sec.

FIG. 13 is a graph showing optical output waveforms of RZ signals of 40 Gbit/sec. The horizontal axis shows elapsed time [psec] and the vertical axis shows relative optical output. The broken line shows a case of the differential driving system and the solid line shows a comparative example of the single-phase driving system (refer to FIG. 10).

It can be seen from the graph that the single-phase driving system of the solid line shows only 3 dB of the extinction ratio, while the differential driving system of the broken line can attain an appropriate optical waveform with 8 dB or more of the extinction ratio.

Embodiment 2

Figure 6:
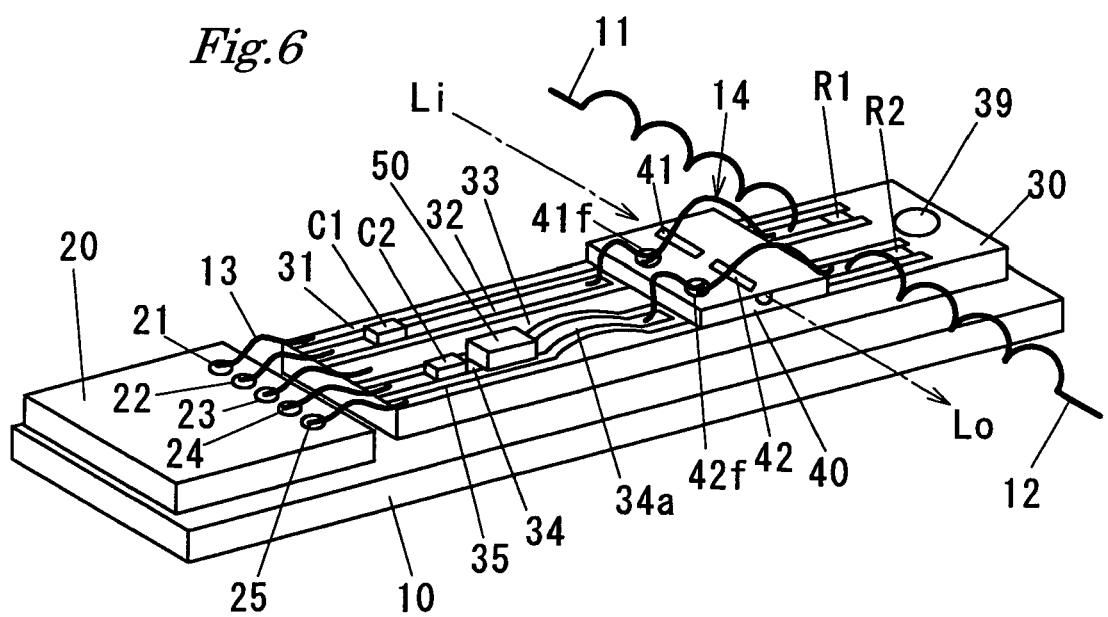
FIG. 6 is a perspective view showing a second embodiment of the present invention.

FIG. 6 is a perspective view showing a second embodiment of the present invention. A differential drive type semiconductor optical modulator includes a chip carrier 10, a differential driver circuit 20 mounted on the chip carrier 10, a transmission-line substrate 30 mounted on the chip carrier 10, a optical modulator integrated device 40 mounted on the transmission-line substrate 30, and a phase inverter 50 for inverting phase of an electric signal by 180 degrees.

The chip carrier 10, the differential driver circuit 20 and the transmission-line substrate 30 are similar to those of FIG. 1, so redundant descriptions will be omitted here.

The optical modulator integrated device 40 is a chip in the shape of a rectangular parallelepiped which has been cut away from a semiconductor wafer, which includes semiconductor modulators 41 and 42 arranged in series along a common optic axis, and an optical waveguide 43 for optically connecting the semiconductor modulators 41 and 42.

Each of the semiconductor modulators 41 and 42 can be constituted of an electro-absorption (EA) type optical modulator using, for example, quantum confined Stark effect or Franz-Keldysh effect, the equivalent circuit thereof can be expressed as a p-n junction diode.

In this embodiment, the differential signal Sb out of differential signals Sa and Sb from the differential driver circuit 20 is phase-inverted by the phase inverter 50, and the driving signals having the same phase will be supplied to the semiconductor modulators 41 and 42. Therefore, the semiconductor modulators 41 and 42 are connected to transmission lines 32 and 34 so as to have the same polarity.

Providing the phase inverter 50 in at least one of the transmission lines 32 and 34 enables timings of modulation of the semiconductor modulators 41 and 42 to coincide with each other, resulting in an appropriate optical modulation waveform with a higher extinction ratio.

on the top face of the optical modulator integrated device 40, a cathode 41f of the semiconductor modulator 41 and a cathode 42f of the semiconductor modulator 42 are provided separately. On the back face of the optical modulator integrated device 40, common electrodes (not shown) to which anodes of the semiconductor modulators 41 and 42 are connected in common are provided at three locations. Each of common electrodes is joined to each of pads 31e, 33e and 35e of transmission lines 31, 33 and 35 when mounted on the transmission-line substrate 30.

The transmission lines 32 and 34 on the transmission-line substrate 30 are divided at the front and rear of the optical modulator integrated device 40, and four wires 14 make a connection between the transmission lines 32 in input side and the anode 41f, a connection between the anode 41 and the transmission lines 32 in output side, a connection between the transmission lines 34 in input side and the anode 42f, and a connection between the anode 42f and the transmission lines 34 in output side.

By employment of such wire-bonding connections, as shown in the equivalent circuit in FIG. 5, the wiring inductance Lpi in the input side and the wiring inductance Lpo in the output side of the semiconductor modulators 41 and 42 can be controlled.

Since the wiring inductances Lpi and Lpo are proportional to wiring lengths, the cathodes 41f and 42f of the optical modulator integrated device 40 are positioned in the input side from the optical waveguide 43, preferably as close to the transmission lines 32 and 34 in the input side as possible, thereby decreasing the wiring inductance Lpi in the input side because of the shorter wire 14 in the input side, on the other hand, increasing the wiring inductance Lpo in the output side because of the longer wire 14 in the output side, and consequently, as described above, to compensate narrowing of bandwidth due to the junction capacitance Cea of the semiconductor modulators 41 and 42 and to significantly enhance a cutoff frequency in the differential driving system.

The wiring inductance Lg in the ground side is negligibly small, because bump-bonding is employed between an electrode and a pad.

Incidentally, in the above embodiments, in case where the semiconductor modulator 41 is arranged in the optical incident side and the semiconductor modulator 42 is arranged in the optical exit side, the intensity of light inside the semiconductor modulator 41 is lower than that inside the semiconductor modulator 42. Therefore, optical current due to optical absorption is more generated in the semiconductor modulator 41, and the current load in differential driver circuit 20 may be imbalanced. For a countermeasure thereof, making the optical path length of the semiconductor modulator 41 shorter than that of the semiconductor modulator 42 can resolve the quantitative imbalance of optical current to prevent degrading of operation waveform of the differential driver circuit 20.

Furthermore, the above description shows example cases where two semiconductor modulators arranged in series along an optic axis are driven by differential signals, however, three or more semiconductor modulators arranged in series along an optic axis may be differentially driven.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A differential drive semiconductor optical modulator comprising:

a differential driver circuit having first and second output terminals which can output a pair of differential signals;

a transmission-line substrate having a first transmission line connected to the first output terminal, a second transmission line connected to the second output terminal, and a ground line;

a first semiconductor modulator connected between the first transmission line and the ground line, mounted on the transmission-line substrate;

a second semiconductor modulator connected between the second transmission line and the ground line, mounted on the transmission-line substrate, the first and second semiconductor modulators being arranged in series along a common optical axis; and a first terminal resistor connected between a terminal end of the first transmission line and the ground line, a second terminal resistor connected between a terminal end of the second transmission line and the ground line, a first inductance interposed between the first semiconductor modulator and the first terminal resistor, and a second inductance interposed between the second semiconductor modulator and the second terminal resistor, located on the transmission-line substrate.

2. The differential drive semiconductor optical modulator according to claim 1, wherein the first semiconductor modulator is arranged on an optical incident side of the optical axis rather than the second semiconductor modulator, and the first semiconductor modulator has an optical path length shorter than optical path length of the second semiconductor modulator.

3. The differential drive semiconductor optical modulator according to claim 1 further comprising an optical modulator integrated device including the first and second semiconductor modulators and an optical waveguide optically connecting the first and second semiconductor modulators.

4. The differential drive semiconductor optical modulator according to claim 3, wherein each of driving electrodes of the first and second semiconductor modulators is arranged on a principal plane of the optical modulator integrated device.

5. The differential drive semiconductor optical modulator according to claim 4, wherein the optical modulator integrated device is mounted on the transmission-line substrate by flip-chip mounting.

6. The differential drive semiconductor optical modulator according to claim 1, wherein the first and second inductances are narrowed portions of the first and second transmission lines.

7. The differential drive semiconductor optical modulator according to claim 1, wherein the first and second semiconductor modulators are mounted in close proximity to the first and second inductances.

8. The differential drive semiconductor optical modulator according to claim 1, including an electric delay portion due to differences in path lengths in at least one of the first and second transmission lines.

9. The differential drive semiconductor optical modulator according to claim 1, including a phase inverter for inverting phase of a signal in at least one of the first and second transmission lines.

10. The differential drive semiconductor optical modulator according to claim 1, wherein the differential signal from the differential driver circuit is an RZ signal.

* * * * *